US007806196B2

(12) United States Patent
Peterson

(10) Patent No.: US 7,806,196 B2
(45) Date of Patent: Oct. 5, 2010

(54) BEVELED EDGER

(75) Inventor: Brent Peterson, Buffalo Grove, IL (US)

(73) Assignee: Echo, Incorporated, Lake Zurich, IL (US)

( * ) Notice: Subject to any disclaimer, the term of this patent is extended or adjusted under 35 U.S.C. 154(b) by 0 days.

(21) Appl. No.: 12/381,125

(22) Filed: Mar. 6, 2009

(65) Prior Publication Data

US 2010/0224378 A1    Sep. 9, 2010

(51) Int. Cl.
*A01D 34/00* (2006.01)
(52) U.S. Cl. .............................. 172/15; 172/17; 172/41
(58) Field of Classification Search .................. 172/13, 172/15, 16, 17, 41, 42
See application file for complete search history.

(56) References Cited

U.S. PATENT DOCUMENTS

| 1,970,838 A * | 8/1934 | Buettner ...................... 172/16 |
| 2,555,441 A * | 6/1951 | Hackney ..................... 172/15 |
| 2,664,807 A * | 1/1954 | Hedrick ...................... 172/15 |
| 2,718,742 A * | 9/1955 | Tangeman .................. 56/17.4 |
| 2,718,838 A * | 9/1955 | Schumacher ................ 172/16 |
| 2,737,105 A * | 3/1956 | Wilson ........................ 172/15 |
| 2,913,058 A * | 11/1959 | Smith et al. ................. 172/15 |
| 3,057,411 A * | 10/1962 | Carlton ........................ 172/15 |
| 3,319,365 A * | 5/1967 | Perry et al. .................. 37/94 |
| 3,872,930 A * | 3/1975 | Campbell .................... 172/15 |
| 4,002,205 A * | 1/1977 | Falk ............................. 172/15 |
| 4,653,590 A * | 3/1987 | Shank ........................... 172/15 |
| 4,914,840 A * | 4/1990 | Porter ....................... 37/142.5 |
| 4,914,899 A * | 4/1990 | Carmine ...................... 56/16.7 |
| 5,226,248 A * | 7/1993 | Pollard ......................... 37/94 |
| 5,355,597 A * | 10/1994 | Pollard ......................... 37/94 |
| 5,441,115 A * | 8/1995 | Horzepa ...................... 172/15 |
| 6,092,608 A * | 7/2000 | Leger ........................... 172/15 |
| 6,263,975 B1 * | 7/2001 | Rosa et al. ................... 172/15 |
| 6,293,349 B1 * | 9/2001 | Marshall et al. ............. 172/15 |
| 6,302,219 B1 * | 10/2001 | Filippini ...................... 172/15 |
| 6,464,015 B1 * | 10/2002 | Jones ........................... 172/15 |
| 6,651,361 B1 * | 11/2003 | Porter et al. ................ 37/355 |
| 6,688,404 B2 * | 2/2004 | Uhl et al. ...................... 172/15 |
| 6,883,616 B2 * | 4/2005 | Templeton ................... 172/42 |
| 7,096,966 B2 * | 8/2006 | Eberhardt et al. ........... 172/15 |
| 7,237,620 B2 * | 7/2007 | Abenroth et al. ............. 172/42 |
| 2002/0104663 A1 * | 8/2002 | Takemoto et al. ............ 172/15 |

* cited by examiner

*Primary Examiner*—Robert E Pezzuto
*Assistant Examiner*—Jamie L McGowan
(74) *Attorney, Agent, or Firm*—Wood, Phillips, Katz, Clark & Mortimer

(57) ABSTRACT

An edger has a main frame that can be advanced controllably relative to a subjacent terrain, a cutting assembly on the main frame, a drive for rotating the cutting assembly around a first axis, and material repositioning structure on at least one of the main frame and cutting assembly. The cutting assembly is configured to produce a trench in underlying terrain as the cutting assembly is rotated by the drive in operation. The material repositioning structure controllably repositions material dislodged from underlying terrain by the cutting assembly to thereby avoid accumulation of dislodged material upon the edger as the edger is operated.

20 Claims, 7 Drawing Sheets

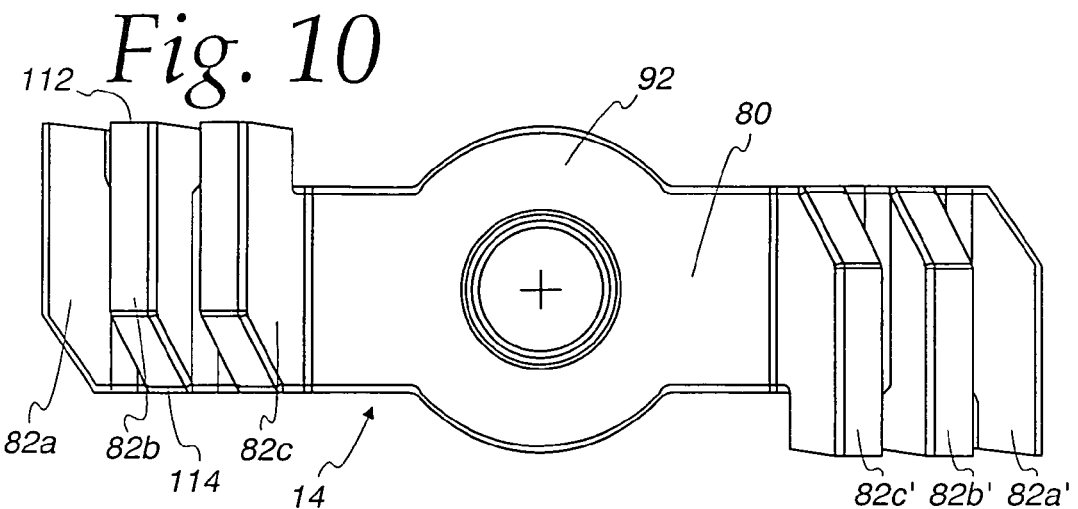
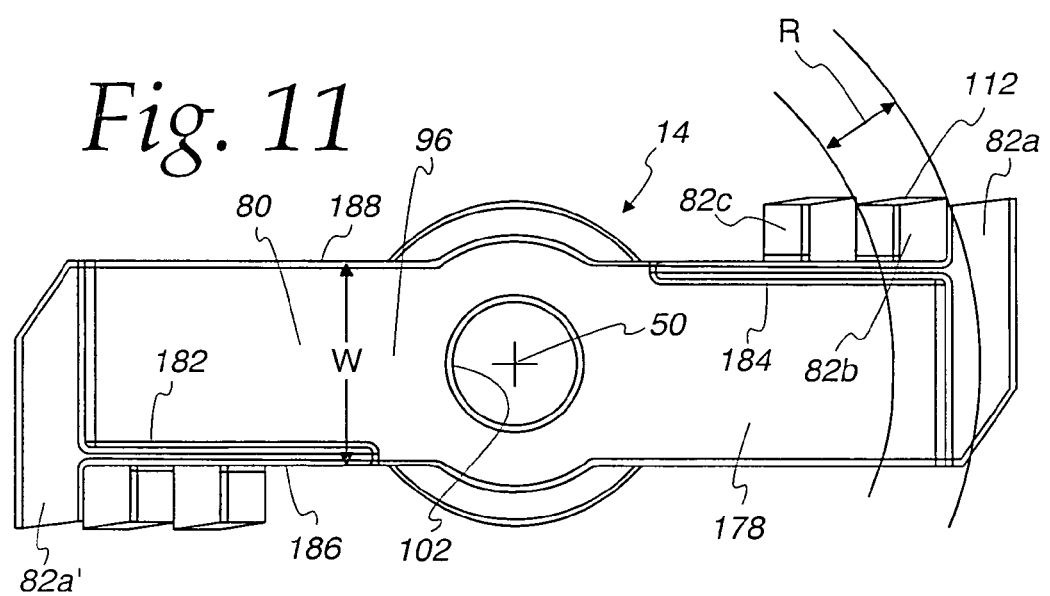
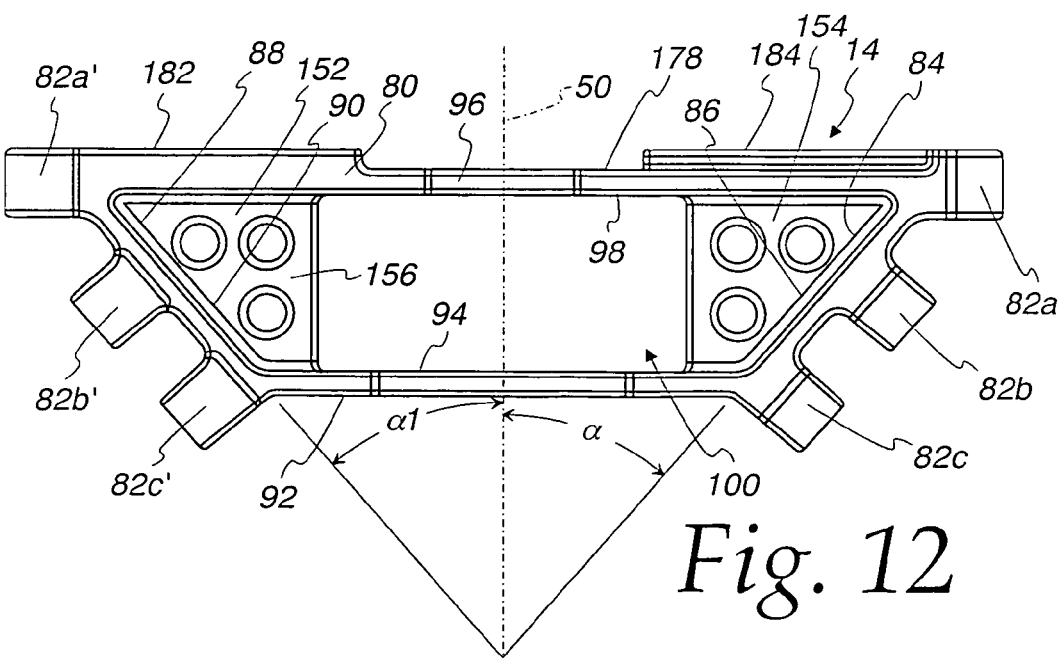

BEVELED EDGER

BACKGROUND OF THE INVENTION

1. Field of the Invention

This invention relates to edgers with a powered cutting assembly that is used to define a demarcation, as between different landscape areas.

2. Background Art

Over the years, the landscaping industry has become more meticulous in terms of making a precise transition between different landscape areas. For example, where lawns are adjacent to beds with flowers and/or bushes, and/or surround trees, a distinct and precise dividing line is desirably formed. Commonly, this line is defined by cutting a trench with a vertical wall at the edge of the lawn area. This avoids spreading of the grass to the adjacent beds and also produces an aesthetically pleasing, sharp, dividing line between the different types of landscape.

It has long been known to form such trenches utilizing conventional hand tools, such as flat-bladed shovels. While manual formation of trenches is desirable from the standpoint of the flexibility and control that it affords a worker, this process has a number of drawbacks.

First of all, manual trench formation can be labor intensive. Since the trench is formed several inches at a time, extended trench formation may require an investment of many man hours, which could dictate the need for potentially large crews. This task is potentially made even more onerous by dry and hard ground conditions. Even with large crews, the nature of this work is such that it may lead to significant worker fatigue.

Another problem with manual trench formation is that it does not lend itself to precise trench placement. Since the trench is formed progressively in small increments, there may result an overall jagged appearance that does not precisely follow an intended course.

Still further, workers must deal with the material removed during the trench formation. In the typical formation using a shovel, large chunks of terrain may be separated. These chunks must either be hauled away to another site or broken up to be distributed in the beds so that they are not identifiable.

Edgers with powered cutting assemblies have long been used in the landscaping industry. One such edger has a rotary, generally flat, disk-shaped blade that is caused to penetrate the ground to produce a trench with spaced vertical walls. The edger has a frame with one or more wheels that facilitate controlled repositioning thereof over a subjacent surface. While this type of edger is relatively simple to use and overcomes problems associated with manual trenching, edging using such a structure has its own limitations and drawbacks.

First of all, the cutting blade is efficient only when it is operating in a state wherein it can aggressively cut the underlying terrain. After extended use, such a blade may be prone to wear, and even failure. In forming a trench in different locations, or over an extended length at a single location, the blade may encounter roots, rocks, metal objects, and virtually an unlimited number of different immersed objects that are hard enough to progressively wear or damage teeth on the blade. Even without encountering any foreign objects, the blade may be compromised due to the continuous abrasive effect from the ground composition, be it dirt, sand, or the like.

A further drawback with this type of edger is that effective trench formation may require a complementary manual step after the cutting blade has performed its intended operation. That is, once the two vertical walls are formed, the material defining one of the vertical walls must be removed. This step is required to create a step below the height of the vertical wall, as at the lawn, whereby a space is defined to accept mulch, or the like, that can be filled to the height of the lawn. This step also avoids the collapse of material into the trench that is likely to otherwise occur naturally under normal weather conditions, or in the event that there is pressure applied in the vicinity of the trench, as by normal traffic or the passage of equipment. The end result is that manual labor is required, with the same associated drawbacks as discussed above.

It is known to produce a beveled trench with an edger that utilizes a rotary cutting assembly. One known construction has a frame with a series of teeth that are strategically disposed so that they cooperatively produce a beveled or "V"-shaped trench as the cutting assembly is directed into underlying terrain and rotated in operation. This design is preferred from the standpoint that it makes possible the elimination of heavy manual steps and causes a trench of desired configuration to be formed in a single pass of the edger over the underlying terrain. Commonly, this type of edger is supported on a wheeled frame and is steered and advanced through frame components that can be engaged by an operator with the operator in a comfortable, upright position. However, this design has also had significant drawbacks which have limited its viability and acceptance in the industry.

First of all, the teeth are commonly made with an elongate configuration and are oriented on a support so that a substantial length of each of the teeth engages the underlying terrain to produce the cutting action. During operation, there may be significant bending forces imparted to the teeth that dictates that there be an overall heavy construction, that may nonetheless be prone to failure. Additionally, the repetitive contact of a large area of the teeth makes the teeth prone to progressive abrasion that over time may not only affect cutting ability but may alter their shape and that of the cut effected therewith in the terrain.

As a result, these cutting assemblies may have to be made with such a robust construction that they are impractical from both the standpoint of weight and cost. Even then, the above construction makes the teeth unavoidably prone to dulling, reconfiguration, and potentially failure.

These altered teeth conditions could lead to some other significant undesired consequences. Most significantly, if the teeth do not aggressively cut the underlying terrain, there may be a tendency of the edger to "jump" randomly from the terrain in operation. Aside from the fact that the result is an imprecise trench formation, this condition may lead to an injury.

Alternatively, a worker contends with the fact that the resulting trench may be imprecisely formed. This leaves the option of leaving the trench in this condition, which may be aesthetically compromised, or manually dressing the trench, which introduces other inconveniences and costs, as discussed above.

Alternatively, the user of such edgers may be required to sharpen or periodically refurbish the cutting assembly. This leads to down time and may be impractically expensive.

Still another problem associated with the latter type of edger is their propensity to accumulate dislodged material in a manner whereby the same interferes with the edger operation. As one example, a cutting assembly may have a wall that moves in close proximity to a main frame and/or a component thereon, such as a guard. In moist terrain, as cutting takes place, material may accumulate between the cutting blade assembly and adjacent components relative to which the cutting assembly moves. The accumulation may be to the point that there is a constant frictional force produced upon the cutting assembly, as an incident of which there may be abrasive wear. Even if there is not significant wear, the foreign material buildup may result in there being undesired, extra loading upon the drive for the cutting assembly. Still further, this buildup may be to such an extent that it blocks the normal anticipated path of movement of the terrain as it is being broken up and redistributed in operation.

An additional problem with this conventional powered edging structure is that there is also a tendency of existing designs to keep the cut terrain in place in the trench. This potentially results in a churning action as the cutting assembly continues to rotate within the accumulation of cut material that may be in large proportion stagnant within the completed trench. This phenomenon also contributes to buildup of foreign matter on the cutter assembly and elsewhere throughout the edger. These conditions all detract from the efficient and effective operation of the edger.

In spite of the desirability of using edgers that are powered, landscapers continue to manually form beveled trenches, and contend with the inherent difficulties. The industry continues to seek out designs that make powered edgers more practically usable, particularly from the standpoints of efficiency, effectiveness, weight, reliability and affordability.

SUMMARY OF THE INVENTION

In one form, the invention is directed to an edger having a main frame that can be advanced controllably relative to subjacent terrain, a cutting assembly on the main frame, a drive for rotating the cutting assembly around a first axis, and material repositioning structure on at least one of the main frame and cutting assembly. The cutting assembly is configured to produce a trench in underlying terrain as the cutting assembly is rotated by the drive in operation. The material repositioning structure controllably repositions material dislodged from underlying terrain by the cutting assembly to thereby avoid accumulation of dislodged material upon the edger as the edger is operated.

In one form, the material repositioning structure consists of a first material moving wall with a surface that faces in a leading circumferential direction as the cutting assembly is rotated. The first material moving wall intercepts and propels material dislodged from underlying terrain by the cutting assembly as the edger is operated.

In one form, the main frame has at least one shield component against which material dislodged from underlying terrain, and intercepted by the first material moving wall, is propelled by the first material moving wall as the edger is operated.

In one form, the first material moving wall has at least one discrete opening therethrough to allow selective passage of material dislodged from underlying terrain as the edger is operated.

In one form, the cutting assembly has a cutting frame upon which a plurality of cutting teeth are provided. The cutting frame has a plurality of elongate walls that extend around the circumferentially opening space. The first material moving wall is connected between a plurality of the elongate walls.

In one form, the cutting frame is made up of at least three of the elongate walls joined angularly, end-to-end. The first material moving wall is connected between each of the three walls.

In one form, the plurality of walls between which the first material moving wall is connected project in a leading direction from the surface on the first material moving wall to thereby define a confining rim at least partially around the surface of the first material moving wall.

In one form, the cutting assembly has a cutting frame with first and second sides diametrically oppositely located with respect to the first axis. There is a plurality of cutting teeth on the first side of the frame and a plurality of cutting teeth on the second side of the frame. The first material moving wall is on the first side of the cutting frame.

The material repositioning structure may include a second material moving wall with a surface that faces in a leading circumferential direction as the cutting assembly is rotated. The second material moving wall is on the second side of the cutting frame.

In one form, the first and second material moving walls are spaced from each other in a direction radially with respect to the first axis.

In one form, the cutting assembly has a cutting frame with first and second sides diametrically oppositely located with respect to the first axis. A first cutting tooth is provided on the first side of the frame with a leading end that engages underlying terrain to effect cutting thereof as the edger is operated. The leading end of the cutting tool is spaced circumferentially from the first material moving wall. The first material moving wall is in a circumferentially trailing position with respect to the leading end of the cutting tooth so that material dislodged from underlying terrain by the leading end of the cutting tooth can be substantially instantaneously intercepted by the first material moving wall.

In one form, the leading end of the cutting tooth is substantially flat to reside within a plane. The plane is not parallel to the first axis and is inclined so as to deflect material dislodged by the leading end of the cutting tooth towards a path traveled by the first material moving wall as the edger is operated.

The cutting frame may consist of a plurality of elongate walls joined angularly end-to-end. A radial opening is defined through the cutting frame and is bounded by a plurality of the elongate walls and the first and second material moving walls.

In one form, the cutting assembly has a cutting frame with a wall with an axially facing surface. The main frame has an axially facing surface that faces, and is directly exposed to, the axially facing surface on the cutting frame wall. There is a space between the axially facing surfaces on the cutting frame and the main frame. The material repositioning structure is in the form of at least one component that resides within the space and repositions material dislodged from underlying terrain by the cutting assembly to thereby avoid accumulation of dislodged material in the space between the axially facing surfaces on the cutting frame and the main frame as the edger is operated.

The at least one component may be in the form of a first projection from the axially facing surface on the cutting frame.

The first projection may be in the form of a first elongate fin.

The at least one component may further include a second projection from the axially facing surface on the cutting frame. The first and second projections are spaced from each other.

In one form, the cutting frame wall is elongate with a length in a radial direction. The first projection is elongate with a length. The length of the first projection nominally aligns with the length of the elongate cutting frame wall.

In one form, the cutting frame wall has a width between spaced edges and the first projection defines at least a portion of one of the spaced edges.

The invention is further directed to a cutting assembly for an edger. The cutting assembly has a cutting frame with cutting teeth. The cutting frame has a first, rotary axis. The cutting assembly is configured to produce a trench in underlying terrain as the cutting assembly is rotated in operation around the first axis. The cutting assembly further includes material repositioning structure thereon for controllably repositioning material dislodged from underlying terrain by the cutting assembly to thereby avoid accumulation of dislodged material upon the edger as the edger is operated.

BRIEF DESCRIPTION OF THE DRAWINGS

FIG. 10 is a side elevation view of the cutting assembly in FIGS. 8 and 9;

FIG. 11 is an elevation view of the cutting assembly taken from the side opposite that in FIG. 10;

FIG. 12 is a bottom view of the cutting assembly in FIGS. 8-11;

DETAILED DESCRIPTION OF THE PREFERRED EMBODIMENTS

Figure 1:
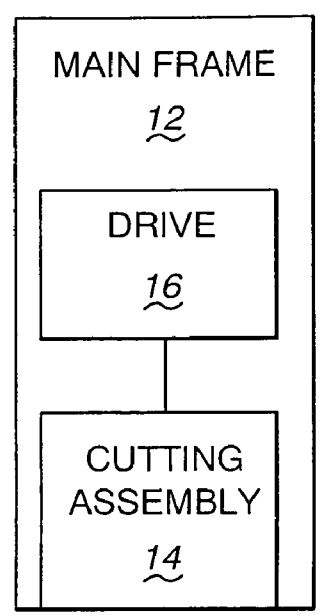
FIG. 1 is a schematic representation of an edger, according to the present invention, and having a cutting assembly powered by a drive.

In FIG. 1, an edger, of a general type into which the present invention is incorporated, is shown schematically at 10. The edger 10 consists of a main frame 12 that can be advanced controllably relative to subjacent terrain. A cutting assembly 14 is provided on the main frame 12. A drive 16 rotates the cutting assembly 14 around a first, rotary axis. The edger 10 is shown in schematic form since this showing is intended to encompass, within the inventive concept, virtually an unlimited number of variations of the components therein. The edger 10, as described in detail below, is exemplary in nature and not intended to be limiting in this regard.

Figure 2:
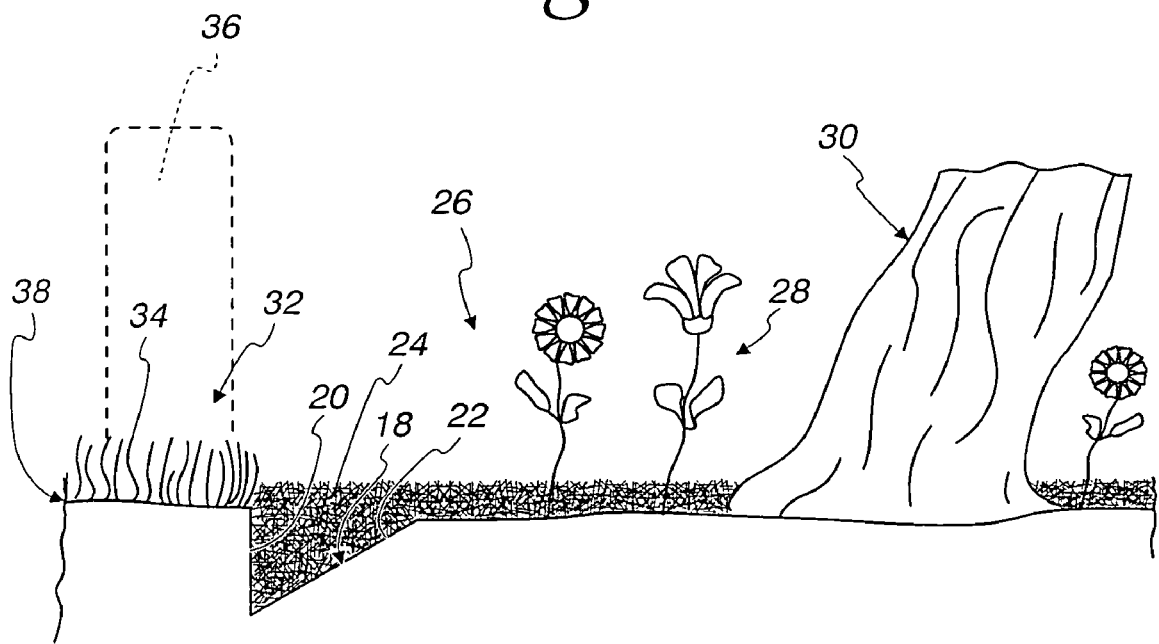
FIG. 2 is a cross-sectional view of a typical landscape location and showing a trench of a configuration that may be formed using the edger of FIG. 1.
Figure 3:
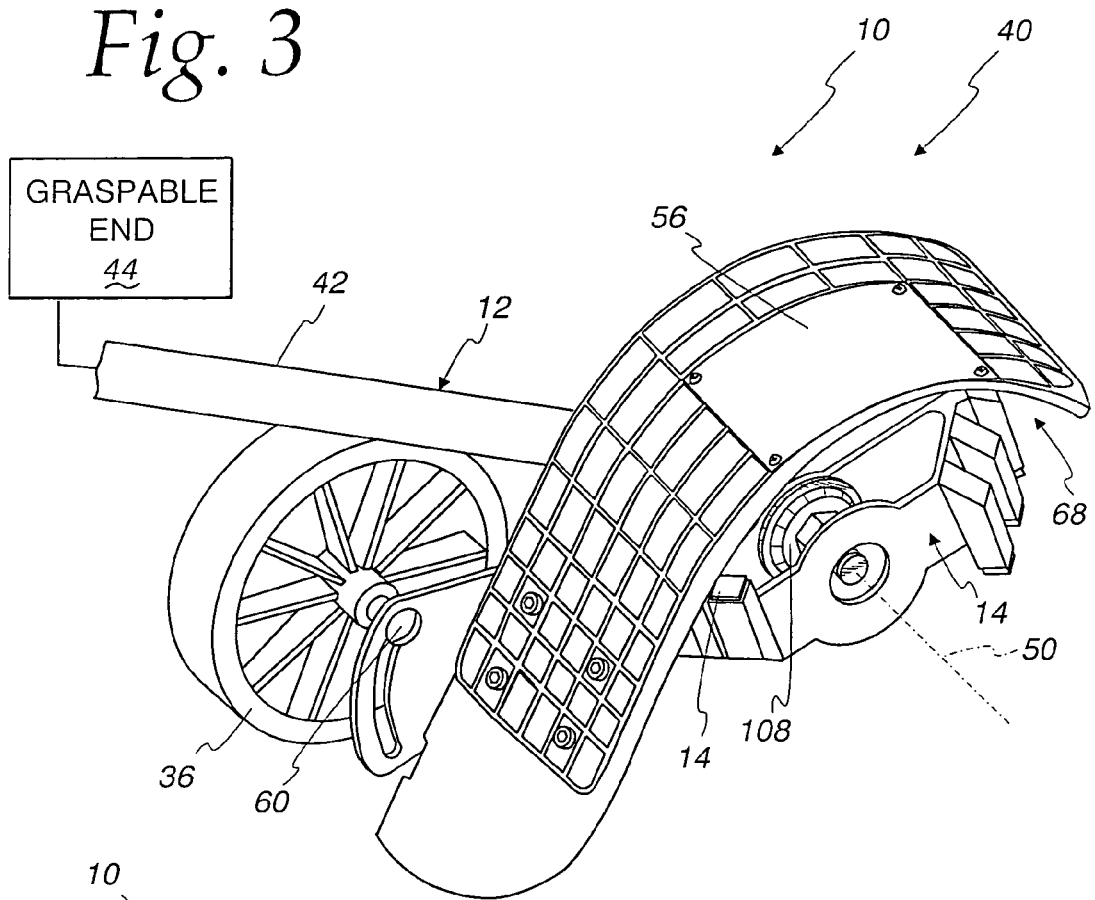
FIG. 3 is a fragmentary, partially schematic, perspective view of one specific form of the edger shown in FIG. 1.
Figure 4:
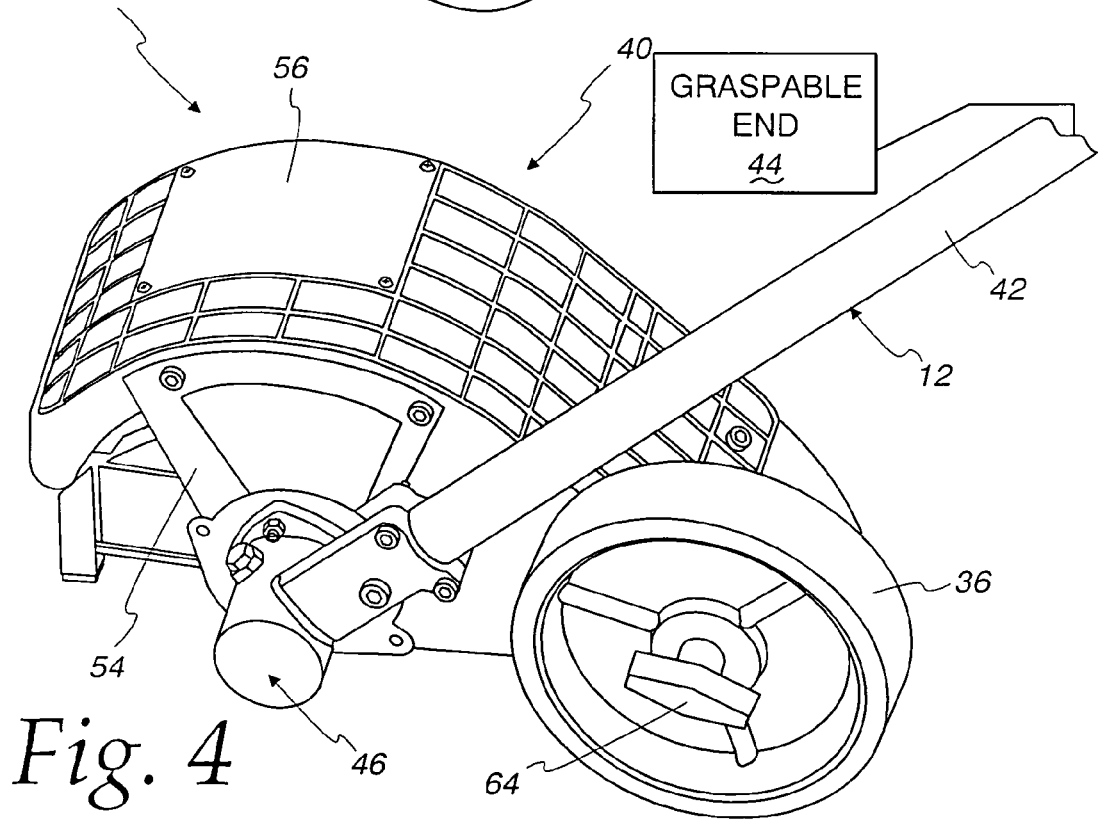
FIG. 4 is a view as in FIG. 3 from a different perspective.
Figure 5:
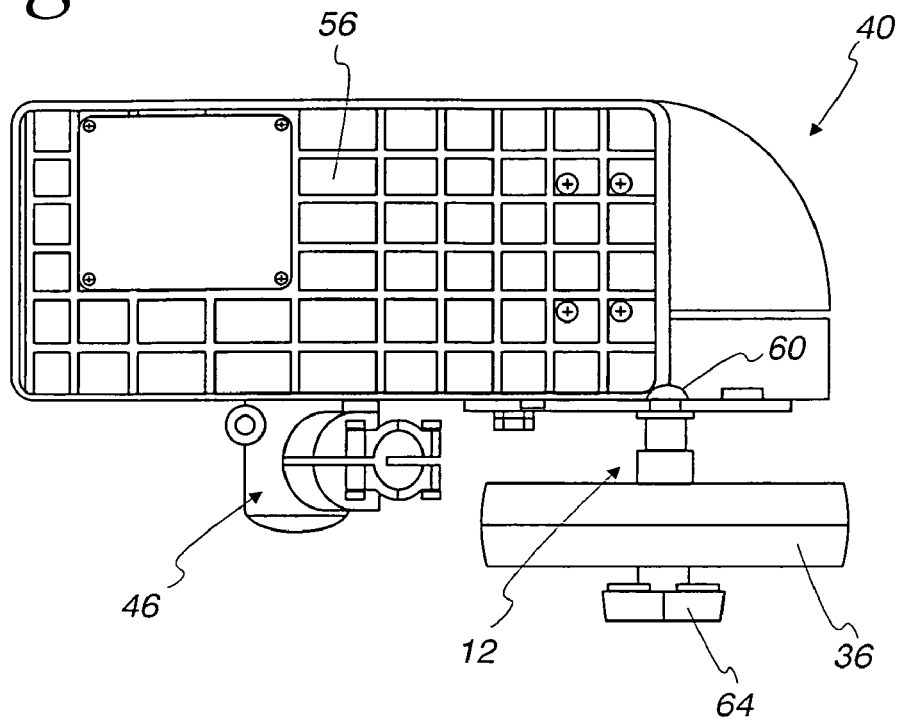
FIG. 5 is a plan view of an operating head on the edger of FIGS. 3 and 4.
Figure 6:
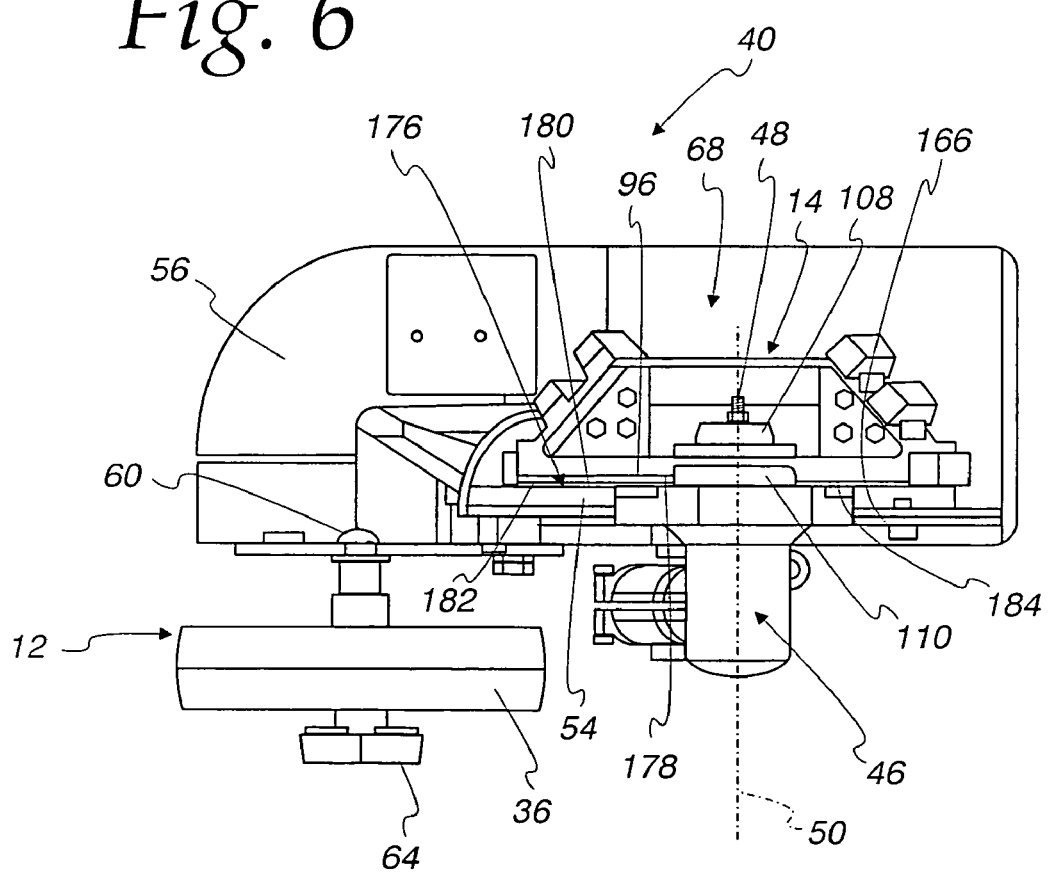
FIG. 6 is a bottom view of the edger in FIGS. 3-5.
Figure 7:
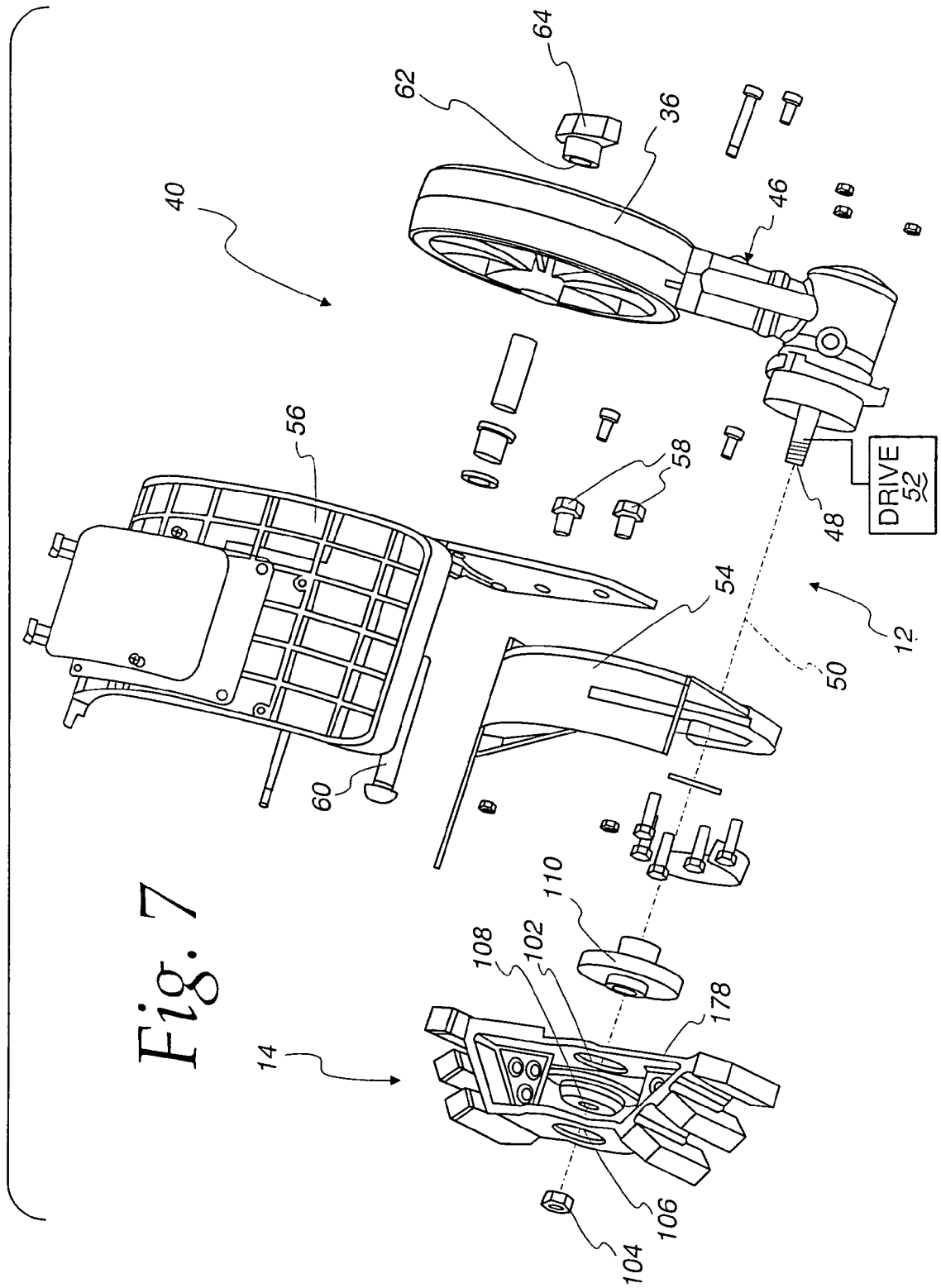
FIG. 7 is an exploded, perspective view of the operating head on the edger in FIGS. 3-6.
Figure 8:
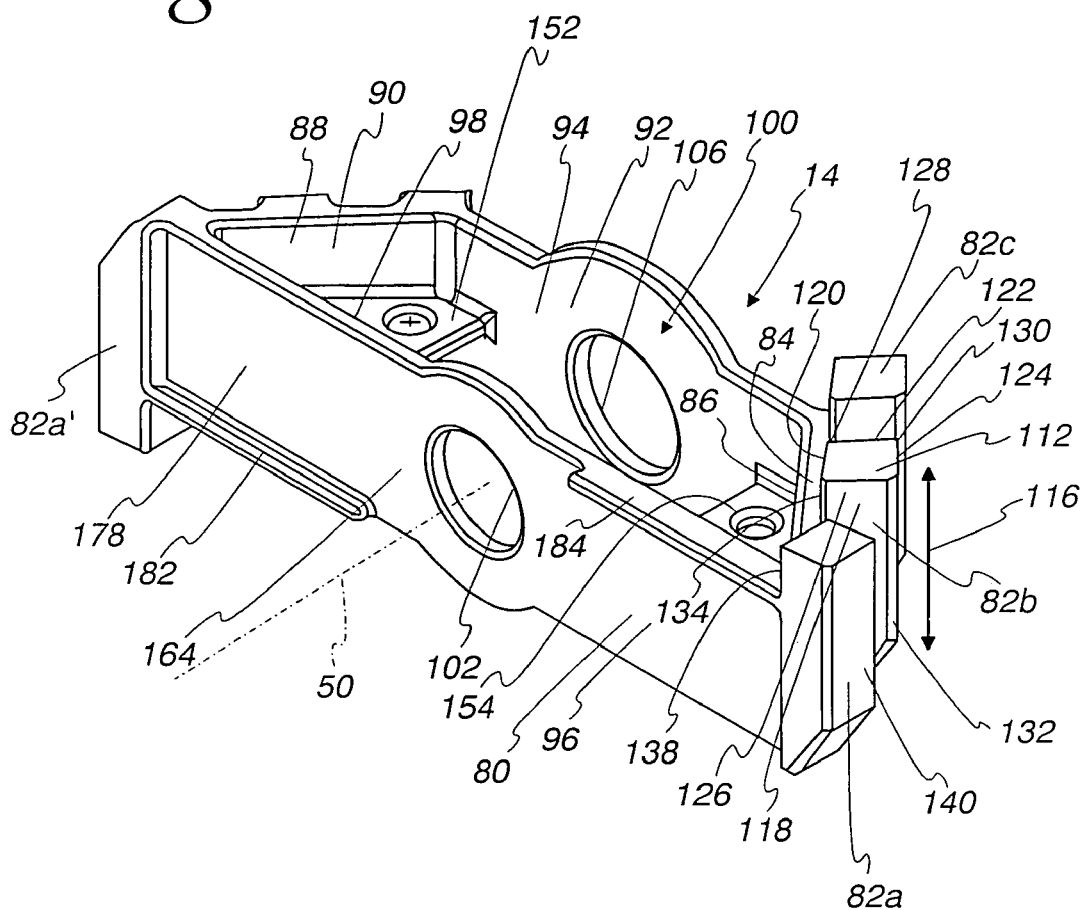
FIG. 8 is a perspective view of the cutting assembly on the edger in FIGS. 3-7.

The edger 10 is ideally one that is characterized as a beveled edger that is designed to produce a "V"-shaped trench 18, as shown in FIG. 2. The trench 18 is bounded by a vertical wall 20 and an angled wall 22 that cooperatively produce a receptacle for the placement of mulch 24, or the like, commonly used in bedding areas at 26 where there is growth such as flowers 28 and/or trees (one shown) 30. The area at 32, adjacent to the bedding area 26, is shown as lawn. The trench 18 establishes a sharp dividing line between the separate landscaping areas 26, 32. The trench 18 additionally, by reason of the depth of the vertical wall 20, limits the spread of grass 34 to the bedding area 26.

A specific form of the edger 10 will now be described with respect to FIGS. 3-15. The main frame 12 incorporates at least one wheel 36 that can be borne and rolled against underlying terrain, as shown generally at 38 in FIG. 2, during operation thereof. The wheel 36 is integrated into an operating head 40 that is manipulated by an operator through an elongate housing 42 that extends annularly and upwardly from the operating head 40. The housing 42 has a graspable end 44 that is configured to be comfortably and positively held by a user as he/she repositions the edger 10 strategically during operation thereof.

The operating head 40 includes a right angled gear box 46 with a projecting operating shaft 48. The shaft 48 is moved around a first, rotary axis 50 by a powered drive 52 that may be either on the head 40 or the housing 42. The nature of the drive 52 is not critical to the present invention. As just examples, the drive 52 could be operated electrically or through the combustion of an operating fuel.

The operating head 40 additionally includes first and second shield components 54, 56 that are joined to each other through bolts 58, and to which the wheel 36 is joined through a bolt 60 and a cooperating nut 62 integrated into a graspable knob 64.

The shield components 54, 56 cooperatively bound a shrouded chamber 68 within which the cutting assembly 14 is mounted and operates. The operating shaft 48 extends through the shield component 54 and is exposed to support the cutting assembly 14 that rotates with the shaft 48 around the first, rotary axis 50 during operation of the edger 10.

In operation, as seen in FIG. 2, the wheel 36 is advanced guidingly against and along the underlying terrain 38. As this occurs, the cutting assembly 14 produces the "V"-shaped trench 18 as shown in that same figure.

Details of the cutting assembly 14 are most clearly seen in FIGS. 8-14. The cutting assembly 14 consists of a cutting frame 80 upon which a plurality of cutting teeth 82a, 82b, 82c, 82a', 82b', 82c' (collectively 82) are located in like arrangement on diametrically opposite sides of the cutting frame 80. The cutting teeth 82 dig into the underlying terrain 38 as the cutting assembly 14 is operated, to thereby cooperatively produce the "V"-shaped trench 18 therein. In this embodiment, the teeth 82 have substantially the same configuration. This, however, is not a requirement.

The cutting frame 14 has a first wall 84 with a first flat surface 86 that makes an acute angle α with the axis 50. The cutting frame 80 has a second wall 88 with a second flat surface 90 that makes an acute angle α1 with the axis 50. The included angle between the surfaces 86, 90 (α+α1) is shown as an acute angle that is slightly less than 90°. This angle could be 90° or slightly greater.

A third wall 92 extends between the first and second walls 84, 88 and has a third flat surface 94. A fourth wall 96 extends between the first and second walls 84, 88 and has a fourth flat surface 98 that is spaced from, and substantially parallel to, the third flat surface 94.

It is not critical that the walls 84, 88, 92, 96, or their associated surfaces 86, 90, 94, 98, be perfectly flat. However, for purposes of simplicity, each of these walls 84, 88, 92, 96 can be considered elongate and flat with minimal thickness. The first, second, third and fourth walls 84, 88, 92, 96 are angularly joined, end-to-end, to cooperatively extend continuously and fully around a trapezoidal, circumferentially opening space/shape 100.

With the cutting assembly 14 in its operative position on the operating head 40, the shaft 48 extends through a bore 102 through the wall 96 and is secured by a nut 104 that may be accessed through a bore 106 through the wall 96. The shaft 48 extends additionally through mounting components 108, 110 between which the wall 96 is captively held.

As noted above, each of the cutting teeth 82 may have the same configuration. Exemplary cutting tooth 82b has an elongate configuration with a length L (FIGS. 14 and 15) between a leading end 112 and a trailing end 114. The length L extends along a first line, indicated by the arrow 116. The first line 116 is substantially perpendicular to a radial line extending from the axis 50.

In the depicted embodiment, the tooth 82b has a squared shape, as viewed in cross section taken transversely to the length of the tooth 82b. More particularly, the cutting tooth 82b has a body 118 with a periphery defined by four flat faces 120, 122, 124, 126. In the depicted embodiment, the flat faces 120, 122, 124, 126 meet each other at vertices 128, 130, 132, 134. In the depicted form, the flat faces 120, 122, 124, 126 make a 90° angle with respect to each other at each of the vertices 128, 130, 132, 134. While not a requirement, in this embodiment all four of the faces 120, 122, 124, 126 have an equal width, whereby the cross-section of the body 118 transversely to the first line 116 is substantially square. Other squared or non-squared polygonal shapes are also contemplated.

As depicted, the tooth 82b has a substantially uniform cross-sectional shape. This shape continues over at least a majority of the length of the cutting tooth 82b, ignoring the slightly increased thickness at the face 120 whereat it connects to the wall 84. At the trailing end 114, the cutting tooth 82b is truncated, thereby to change the shape thereof from the squared shape at the leading end 112. More particularly, the truncation produces an angled, flat surface 136 that reduces hangup during operation as described hereinbelow.

The cutting tooth 82b is located on the first wall 84 with the surfaces 120, 124 thereon substantially parallel to the wall surface 86. The cutting tooth 82c is located on the wall 84 in spaced relationship with, and in substantially the same orientation as, the cutting tooth 82b.

The cutting tooth 82a has the same lengthwise alignment as the cutting teeth 82b, 82c, but is turned about its length so that its faces 138, 140, corresponding to the faces 120, 124 on the cutting tooth 82b, are parallel to each other and perpendicular to the flat surface 98.

The cutting teeth 82a', 82b', 82c' have the same relationship with the cutting frame 80 as the cutting teeth 82a, 82b, 82c do on the diametrically opposite side of the cutting assembly 14, but are inverted. That is, if one pivoted the half of the cutting assembly 14 containing the cutting teeth 82a, 82b, 82c on one side of the axis 50 180° around the axis 50, this would reproduce the arrangement of the cutting teeth 82a', 82b', 82c'.

The teeth 82 are configured and oriented so that, as shown for exemplary cutting tooth 82b, forces F from the terrain that resist cutting are aligned generally with the length of the cutting tooth 82b, substantially along the first line 116. The lengths of the teeth 82 are aligned generally in a circumferential direction so that terrain cutting is initiated and carried out primarily by the leading end 112 and potentially by the region immediately therebehind. The angle of attack between the lengths of the teeth 82 and underlying terrain preferably ranges from 90°±15-25°. Greater variations are contemplated, however this may significantly affect performance for reasons explained below.

The number and precise arrangement of the teeth 82 is not critical. It is anticipated that at least four such teeth 82 will be required. Regardless of their number and configuration, the objective is that the cutting teeth 82 cooperatively form the desired trough shape as the cutting assembly 14 is rotated in operation.

As noted above, the primary cutting and digging action is effected through the leading ends of the cutting teeth 82 that face in a circumferential direction. The remainder of the bodies on the cutting teeth 82 are thus allowed to pass through the underlying terrain without significant resistance. This is further facilitated by the truncation of the trailing ends of the cutting teeth 82, such as that producing the surface 136 on the cutting tooth 82b. By shaping the cutting teeth 82 in this manner, the trailing ends thereof do not bind within the terrain as they pass through the concave cut region of the trench 18. At the same time, the configuration and alignment of the cutting teeth 82 causes essentially the entire weight of the teeth 82 to be moved in a concentrated mass in a path aligned with their centers. The cutting teeth 82 thus move with large momentum forces during operation of the edger 10.

As can be seen in FIG. 11, the exemplary cutting tooth 82b is oriented on the cutting assembly 14 so that the length of the cutting tooth 82b traces a path during operation that has a radial extent R with respect to the axis 50 that is substantially less than the length L of the tooth 82b.

Also, it can be seen that with the leading end 112, as shown, substantially flat and residing in a plane that is substantially orthogonal to the first line 116, the plane of the leading end 112 faces circumferentially relative to a circular shape centered on the first axis as the edger 10 is operated.

It should also be noted that the while the leading end 112 may be perfectly orthogonal to the first line 116, more preferably, there is a slight inclination of the leading end 112, as seen in FIG. 11, wherein an outermost edge at the faces 124, 126 at the leading end 112 initially contacts the underlying terrain to more aggressively effect a gouging/cutting action. This shape also tends to divert cut terrain slightly radially inwardly.

With the above-described arrangement of cutting teeth 82, bending forces upon the elongate cutting teeth 82 can be minimized by reason of directing the resistant forces generated through operation lengthwise of the cutting teeth 82. Additionally, the primary cutting is accomplished by the leading end 112 which is also positively reinforced by the remainder of the exemplary tooth 82b that is secured to the cutting frame 80. Thus, wear, if any, is limited primarily to the leading region of the teeth 82, whereupon refurbishing and/or sharpening can be relatively easily carried out, if necessary.

As the angle of attack for the teeth 82 changes from nominally 90° to a certain degree of deviation, these advantages may diminish significantly. The operating momentum for the teeth 82 may decrease. Resistant forces are applied at a greater angle to the tooth lengths and the teeth 82 thus become more prone to bending and/or breaking away from the remainder of the cutting assembly 14. In operation, greater frictional forces acting between the teeth 82 and underlying terrain may be developed that put greater strain on the entire cutting assembly 14 and its driving components.

The entire cutting assembly 14 may be a cast part. Alternatively, the cutting teeth 82 might be welded in place. Ideally, a hardened steel is used to fabricate the teeth 82. The hardened material resists abrasive wear. By maintaining the sharp edges on the cutting teeth 82, particularly at their leading ends, cutting characteristics can be maintained through a significant product life.

Figure 16:
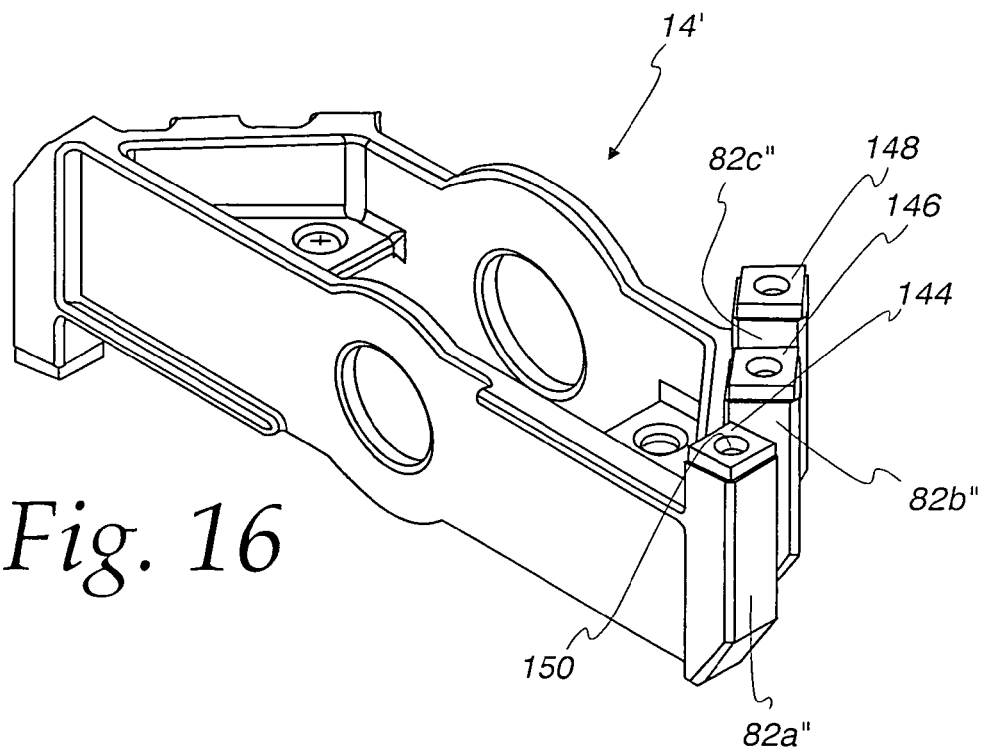
FIG. 16 is a view as in FIG. 8 of a modified form of cutting assembly, according to the present invention.

One variation of the cutting assembly 14 is shown in FIG. 16, wherein a corresponding cutting assembly is shown at 14', with substantially the same overall configuration as the cutting assembly 14, hereinabove described. The only difference resides in the provision of hardened, discrete pads/tips 144, 146, 148 at the leading ends of corresponding cutting teeth 82a'', 82b'', 82c''. Exemplary cutting tip 144 has a central opening 150 which facilitates brazing of the tip 144 to the leading end of the cutting tooth 82a''.

Each of the cutting tips 144, 146, 148 may be made from a material that effectively withstands the rigors of the cutting environment. For example, a carbide material may be used. Like tips (not shown) are provided on the remaining teeth on the cutting assembly 14'.

Many variations from the particular embodiments discussed above are contemplated. As one example, the cutting teeth need not be squared but may have any other shape, such as one with a polygonal outline that is not square, one that is a combination of curved and flatted surfaces, etc. All that is critical is that the cutting teeth cooperatively cut a trench of desired configuration in operation.

Further, the precise configuration of the trench that might be formed is not limited to that shown in FIG. 2.

Additionally, there is no requirement that the edger 10 have a wheel 36, as shown. Any structure that facilitates guided movement over an underlying terrain could be incorporated. Multiple wheels might also be used.

To avoid accumulation of material, dislodged from the underlying terrain by the cutting assembly 14, upon the edger 10, material repositioning structure is provided on the edger 10.

As seen for the exemplary cutting assembly 14, the material repositioning structure consists of first and second material moving walls 152, 154, respectively provided within the space 100. The material moving walls 152, 154 have flat surfaces 156, 158, respectively, that each resides in a plane and faces in a leading circumferential direction as the cutting assembly 14 is rotated. The lengths L of the cutting teeth 82 extend along lines that are transverse to the planes of the flat surfaces 156, 158. The surfaces 156, 158 intercept and propel material dislodged from underlying terrain by the cutting assembly 14 against at least one, and potentially both, of the shielding components 54, 56 as the edger 10 is operated. This action tends to break up and potentially pulverize the dislodged material.

The wall 152 is configured to nest closely against the walls 88, 92, 96 at a mid-width location thereon, whereby the walls 88, 92, 96 project in a leading direction from the wall surface 156 to thereby define a confining rim partially around the surface 152. This arrangement creates a mechanism that effectively "scoops" dislodged material that is encountered during rotation of the cutting assembly 14.

The material moving wall 154 cooperates in a similar manner with the walls 84, 92, 96.

By keeping moving the separated material within the trench 18, that would otherwise be stagnant, churning of the cutting assembly 14 therein is avoided. This improves cutting efficiency and breakup of material that is removed to define the trench 18.

Discrete openings 160, 162 are provided through the material moving walls 152, 154, respectively, to allow selective passage of material dislodged from underlying terrain as the edger 10 is operated. Small particles are allowed to pass freely through the openings 160, 162. Particles of a size slightly larger than the openings 160, 162 might be broken up as they are forced through the openings 160, 162 in operation. This avoids the detrimental building up of such small particles upon the wall surfaces 156, 158. Since these particles are in a generally pulverized state, they do not need to be otherwise broken down by being propelled against the shield components 54, 56.

In addition to the function of scooping and propelling dislodged material, the material moving walls 152, 154 also function as gussets, each reinforcing the at least three walls between which it connects.

Figure 9:
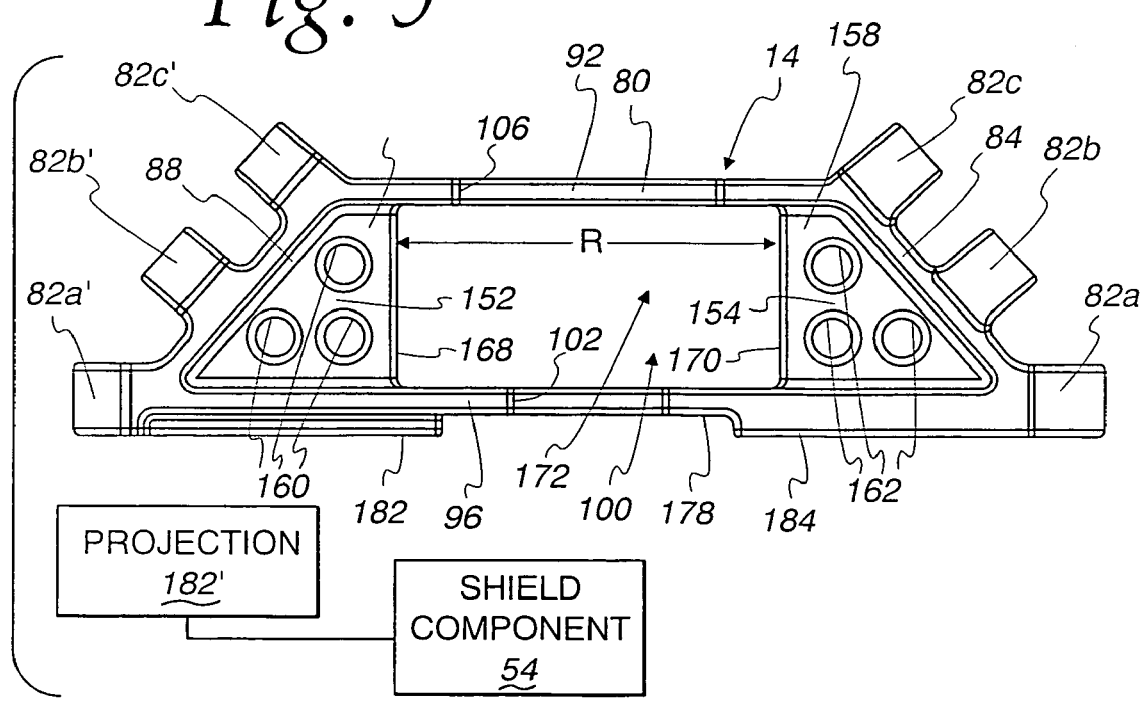
FIG. 9 is a plan view of the cutting assembly in FIG. 8.
Figure 13:
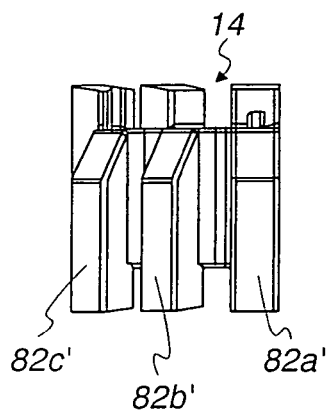
FIG. 13 is a front elevation view of the cutting assembly in FIGS. 8-12.
Figure 14:
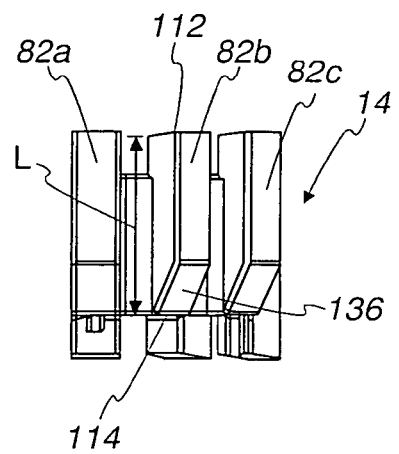
FIG. 14 is a rear elevation view of the cutting assembly in FIGS. 8-13.
Figure 15:
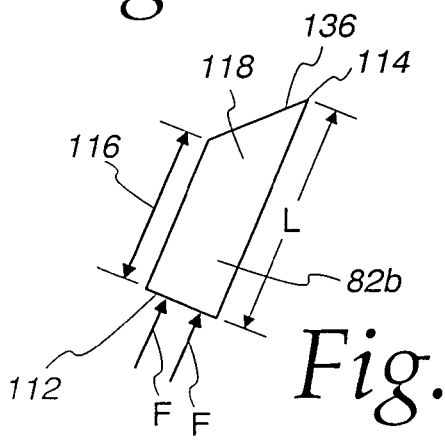
FIG. 15 is an elevation view of one of the cutting teeth on the cutting assembly in FIGS. 8-14.

The cutting frame walls 92, 96 and edges 168, 170 on the material moving walls 152, 154 bound a radial opening 172 within the space 100, as most clearly seen in FIG. 9. Through this opening, dislodged material is allowed to freely pass. The edges 168, 170 are spaced from each other in a radial direction to define the radial dimension R of the opening 172.

The leading end 112 of the exemplary cutting tooth 82b is spaced circumferentially from the material moving wall 154 on the same side of the axis 50. The material moving wall 154 resides in a circumferentially trailing position with respect to the leading end 112 so that material dislodged by the leading end 112 of the cutting tooth 82b can be substantially instantaneously intercepted by the material moving wall 154. As noted above, the plane of the leading end 112 is not parallel to the first axis 50 and is inclined so as to deflect material dislodged by the leading end 112 towards a path traveled by the material moving wall 154 as the edger 10 is operated.

The material repositioning structure additionally avoids accumulation of dislodged material in a space 176 between an axially facing surface 178 on the wall 96 and an adjacent, axially oppositely facing surface 180 on the shield component 54. In the absence of such structure, material may migrate to within the space 176 and accumulate to the point that it may cause the generation of friction that puts extra strain on the drive 52 and potentially slows the operating speed for the cutting assembly 14 to below that which is optimal. This condition may also cause abrasion on edger components that may undesirably lead to reconfiguration or, in a worst case, failure. Still further, the accumulated material may block the designed travel path for dislodged material during operation of the edger 10.

The material repositioning structure, in a broad sense, is in the form of at least one component that resides within the space 176. More particularly, one, and in this case two, projections 182, 184 are formed on the axially facing surface 170 and project, each toward the surface 180.

Each of the projections 182, 184 is in the form of an elongate fin that sweeps through the space 176 directly between the facing surfaces 178, 180. Together, the projections 182, 184 extend across substantially the full radial extent of this space 176 outward of the mounting component 110.

In the depicted form, the projections 182, 184 are spaced fully from each other. The projections 182, 184 are elongate, each with a length that is nominally aligned with the length of the cutting frame wall 96.

The cutting frame wall 96 has a width W (FIG. 11) between spaced edges 186, 188. The projection 182 defines a portion of the edge 186, with the projection 184 likewise defining a portion of the edge 188.

In FIG. 9, a projection 182', corresponding to the projection 182, is provided on the surface 180 on the shield component 54. This construction is shown as an alternative to providing one or both of the projections 182, 184 on the cutting frame 80. However, this construction, while feasible, is not preferred since accumulation of a significant amount of material may still occur in the space 176 with this construction. On the other hand, with the projections 182, 184 moving at a relatively high rotational speed, the projections 182, 184 tend to sweep through the space 176 and shed any attached material, primarily through centrifugal forces acting thereupon.

The foregoing disclosure of specific embodiments is intended to be illustrative of the broad concepts comprehended by the invention.

The invention claimed is:

1. An edger comprising:
a main frame that can be advanced controllably relative to subjacent terrain;
a cutting assembly on the main frame;
a drive for rotating the cutting assembly around a first axis, the cutting assembly configured to produce a trench in underlying terrain as the cutting assembly is rotated by the drive in operation; and
material repositioning structure on at least one of the main frame and cutting assembly for controllably repositioning material dislodged from underlying terrain by the cutting assembly to thereby avoid accumulation of dislodged material upon the edger as the edger is operated,
wherein the material repositioning structure comprises a first material moving wall with a substantially flat surface that resides in a plane and faces in a leading circumferential direction as the cutting assembly is rotated, the first material moving wall intercepting and propelling material dislodged from underlying terrain by the cutting assembly as the edger is operated,
wherein the plane is parallel to a plane containing the first axis,
wherein the cutting assembly comprises a plurality of cutting teeth that are elongate each with a length extending along a line and the lines are transverse to the plane of the flat material moving wall surface.

2. The edger according to claim 1 wherein the main frame comprises at least one shield component against which material dislodged from underlying terrain and intercepted by the first material moving wall is propelled by the first material moving wall as the edger is operated.

3. The edger according to claim 1 wherein the cutting assembly comprises a cutting frame upon which a plurality of the cutting teeth are provided, the cutting frame comprising a plurality of elongate walls that extend around a circumferentially opening space and the first material moving wall is connected between a plurality of the elongate walls.

4. The edger according to claim 3 wherein the cutting frame comprises at least three of the elongate walls joined angularly end-to-end and the first material moving wall is connected to each of the three walls.

5. The edger according to claim 3 wherein the plurality of walls between which the first material moving wall is connected project in a leading direction from the surface on the first material moving wall to thereby define a confining rim at least partially around the surface of the first material moving wall.

6. The edger according to claim 1 wherein the cutting assembly has a cutting frame with first and second sides diametrically oppositely located with respect to the first axis, there is a plurality of the cutting teeth on the first side of the frame and a plurality of the cutting teeth on the second side of the frame and the first material moving wall is on the first side of the cutting frame.

7. The edger according to claim 6 wherein the material repositioning structure comprises a second material moving wall with a surface that faces in a leading circumferential direction as the cutting assembly is rotated, the second material moving wall on the second side of the cutting frame.

8. The edger according to claim 7 wherein the first and second material moving walls are spaced from each other in a direction radially with respect to the first axis.

9. The edger according to claim 1 wherein the cutting assembly has a cutting frame with first and second sides diametrically oppositely located with respect to the first axis, there is a first cutting tooth in the plurality of cutting teeth on the first side of the frame with a leading end that engages underlying terrain to effect cutting thereof as the edger is operated and the leading end of the first cutting tooth is spaced circumferentially from the first material moving wall, the first material moving wall in a circumferential trailing position with respect to the leading end of the first cutting tooth so that material dislodged from underlying terrain by the leading end of the first cutting tooth can be substantially instantaneously intercepted by the first material moving wall.

10. The edger according to claim 9 wherein the leading end of the first cutting tooth is substantially flat to reside within a plane and the plane is not parallel to the first axis and inclined so as to deflect material dislodged by the leading end of the first cutting tooth towards a path traveled by the first material moving wall as the edger is operated.

11. The edger according to claim 8 wherein the cutting frame comprises a plurality of elongate walls joined angularly end-to-end and there is a radial opening through the cutting frame bounded and fully surrounded by a plurality of the elongate walls and the first and second material moving walls.

12. The edger according to claim 1 wherein the cutting assembly has a cutting frame with a wall with an axially facing surface, the main frame has an axially facing surface that faces and is directly exposed to the axially facing surface on the cutting frame wall, there being a space between the axially facing surfaces on the cutting frame and the main frame and the material repositioning structure comprises at least one component that resides within the space and repositions material dislodged from underlying terrain by the cutting assembly to thereby avoid accumulation of dislodged material in the space between the axially facing surfaces on the cutting frame and the main frame as the edger is operated.

13. The edger according to claim 12 wherein the at least one component comprises a first projection from the axially facing surface on the cutting frame.

14. The edger according to claim 13 wherein the first projection comprises a first elongate fin.

15. The edger according to claim 13 wherein the at least one component comprises a second projection from the axially facing surface on the cutting frame, the first and second projections spaced from each other.

16. The edger according to claim 13 wherein the cutting frame wall is elongate with a length in a radial direction and the first projection is elongate with a length, the length of the first projection nominally aligned with the length of the elongate cutting frame wall.

17. The edger according to claim 16 wherein the cutting frame wall has a width between spaced edges and the first projection defines at least a portion of one of the spaced edges.

18. A cutting assembly for an edger, the cutting assembly comprising:
a cutting frame with cutting teeth and having a first, rotary axis,
the cutting assembly configured to produce a trench in underlying terrain as the cutting assembly is rotated in operation around the first axis,
the cutting assembly further comprising material repositioning structure for controllably repositioning material dislodged from underlying terrain by the cutting assembly to thereby avoid accumulation of dislodged material upon the edger as the edger is operated, wherein the material repositioning structure comprises a first material moving wall with a substantially flat surface that resides in a plane and faces in a leading circumferential direction as the cutting assembly is rotated, the first material moving wall intercepting and propelling material dislodged from underlying terrain by the cutting assembly as the edger is operated, wherein the plane is parallel to a plane containing the first axis, wherein the cutting assembly comprises a plurality of cutting teeth that are elongate each with a length extending along a line and the lines are transverse to the plane of the flat material moving wall surface.

19. An edger comprising:

a main frame that can be advanced controllably relative to subjacent terrain;

a cutting assembly on the main frame;

a drive for rotating the cutting assembly around a first axis, the cutting assembly configured to produce a trench in underlying terrain as the cutting assembly is rotated by the drive in operation; and material repositioning structure on at least one of the main frame and cutting assembly for controllably repositioning material dislodged from underlying terrain by the cutting assembly to thereby avoid accumulation of dislodged material upon the edger as the edger is operated, wherein the material repositioning structure comprises a first material moving wall with a surface that faces in a leading circumferential direction as the cutting assembly is rotated, the first material moving wall intercepting and propelling material dislodged from underlying terrain by the cutting assembly as the edger is operated, wherein the main frame comprises at least one shield component against which material dislodged from underlying terrain and intercepted by the first moving wall is propelled by the first material moving wall as the edger is operated, wherein the first material moving wall has at least one discrete opening that extends through the surface on the first material moving wall and fully through the first material moving wall to allow selective passage of material dislodged from underlying terrain as the edger is operated.

20. An edger comprising:

a main frame that can be advanced controllably relative to subjacent terrain;

a cutting assembly on the main frame;

a drive for rotating the cutting assembly around a first axis, the cutting assembly configured to produce a trench in underlying terrain as the cutting assembly is rotated by the drive in operation; and material repositioning structure on at least one of the main frame and cutting assembly for controllably repositioning material dislodged from underlying terrain by the cutting assembly to thereby avoid accumulation of dislodged material upon the edger as the edger is operated, wherein the material repositioning structure comprises a first material moving wall with a surface that faces in a leading circumferential direction as the cutting assembly is rotated, the first material moving wall intercepting and propelling material dislodged from underlying terrain by the cutting assembly as the edger is operated, wherein the first material moving wall has at least one discrete opening that extends through the surface on the first material moving wall and fully through the first material moving wall to allow selective passage of material dislodged from underlying terrain as the edger is operated.

* * * * *